(12) United States Patent
Park

(10) Patent No.: US 8,245,368 B2
(45) Date of Patent: Aug. 21, 2012

(54) MAT FOR VEHICLES

(75) Inventor: Mun Gyu Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 615 days.

(21) Appl. No.: 12/267,451

(22) Filed: Nov. 7, 2008

(65) Prior Publication Data
US 2009/0151135 A1 Jun. 18, 2009

(30) Foreign Application Priority Data
Dec. 12, 2007 (KR) .................. 10-2007-0129298

(51) Int. Cl.
*A44B 17/00* (2006.01)
(52) U.S. Cl. .......................... 24/573.11; 16/4
(58) Field of Classification Search ............ 24/457, 24/458, 90.1, 104, 651, 629, 633, 662, 573.09, 24/573.11; 16/4
See application file for complete search history.

(56) References Cited

U.S. PATENT DOCUMENTS

| | | | | |
|---|---|---|---|---|
| 1,425,618 A * | 8/1922 | Vodicka | ........................ | 24/607 |
| 1,480,530 A * | 1/1924 | Carr | ........................ | 24/651 |
| 1,670,281 A * | 5/1928 | Carr | ........................ | 24/617 |
| 4,099,303 A * | 7/1978 | Parera | ........................ | 24/640 |
| 4,927,287 A * | 5/1990 | Ohkawa et al. | ........................ | 403/408.1 |
| 5,111,557 A * | 5/1992 | Baum et al. | ........................ | 24/662 |
| 5,189,768 A * | 3/1993 | Riceman et al. | ........................ | 24/634 |
| 6,497,003 B2 | 12/2002 | Calabrese | | |

* cited by examiner

Primary Examiner — Robert J Sandy
Assistant Examiner — Michael Lee
(74) Attorney, Agent, or Firm — Morgan, Lewis & Bockius LLP

(57) ABSTRACT

A fastener includes first and second fastener units that releasably attach to one another. The first fastener unit includes a ring defining an inclined inner surface that narrows downward. The second fastener unit includes an upper plate defining a notched cylinder configured to abut the inclined inner surface of the ring; a lower plate having a seesaw-type push rod; and a push plate, which is operable by a user to press the push rod such that the push rod presses the ring upward. The push plate has a protrusion configured to press the notched cylinder against the inner surface of the ring when the fastener units are attached to one another, and to release the notched cylinder when the push plate is operated by the user. The first fastener unit may be in a vehicle floor mat, and the second fastener unit may be attached to a vehicle floor carpet.

8 Claims, 3 Drawing Sheets

MAT FOR VEHICLES

CROSS-REFERENCE TO RELATED APPLICATIONS

This application claims priority to Korean Application No. 10-2007-0129298, filed on Dec. 12, 2007, the disclosure of which is incorporated herein by reference.

BACKGROUND OF THE INVENTION

1. Field of the Invention

The present invention relates to a floor mat for a vehicle.

2. Description of the Related Art

Generally, a removable mat is placed on a vehicle floor carpet. The mat protects the more permanent carpet from dirt, and is removable for cleaning. A traditional mat may slip during driving. Mats with hook fasteners have been proposed, but are generally inadequate. The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

A fastener includes first and second fastener units configured to be releasably attached to one another. The first fastener unit includes a ring defining an inclined inner surface that narrows downward. The second fastener unit includes an upper plate defining a notched cylinder configured to abut the inclined inner surface of the ring, a lower plate having a seesaw-type push rod, and a push plate. The push plate is operable by a user to press the push rod such that the push rod presses the ring upward. The push plate has a protrusion configured to press the notched cylinder against the inner surface of the ring when the fastener units are attached to one another, and to release the notched cylinder when the push plate is operated by the user.

The notched cylinder may include a locking step on an upper end thereof. The push plate may include a slanted surface on a lower end thereof. The locking step may protrude inwards and be in contact with the slanted surface of the push plate when the fastener units are attached to one another, thus preventing removal of the push plate.

The protruding part may have a groove on an outer surface thereof. The notched cylinder may have a projection at an upper end thereof, configured to be fitted into the groove.

The first fastener unit may be in a mat, such as a vehicle floor mat, and the second fastener unit may be attached to a floor, such as on a vehicle floor carpet.

BRIEF DESCRIPTION OF THE DRAWINGS

The above and other features of the present invention will now be described in detail with reference to certain exemplary embodiments thereof illustrated the accompanying drawings which are given hereinbelow by way of illustration, and thus are not limitative of the present invention, and wherein.

It should be understood that the appended drawings are not necessarily to scale, presenting a somewhat simplified representation of various features illustrative of some embodiments of the invention. The specific design features disclosed herein, including, for example, specific dimensions, orientations, locations, and shapes will be determined in part by the particular intended application and use environment.

DESCRIPTION OF PREFERRED EMBODIMENTS

Reference will now be made in detail to an exemplary embodiment of the present invention, which is illustrated in the accompanying drawings and described below. While the invention will be described in conjunction with an exemplary embodiment, it should be understood that the description is not intended to limit the invention to the disclosed embodiment. On the contrary, the invention is intended to cover not only the exemplary embodiment, but also various alternatives, modifications, equivalents and other embodiments, which may be included within the spirit and scope of the invention as defined by the appended claims.

Figure 4A:
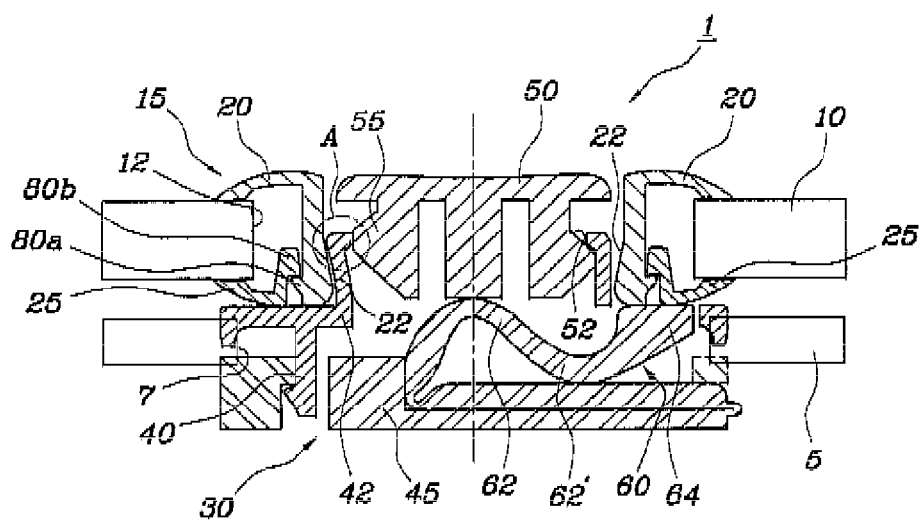
FIG. 4A is a cross-sectional view of the ring unit locked to the button unit, in an exemplary mat.
Figure 5:
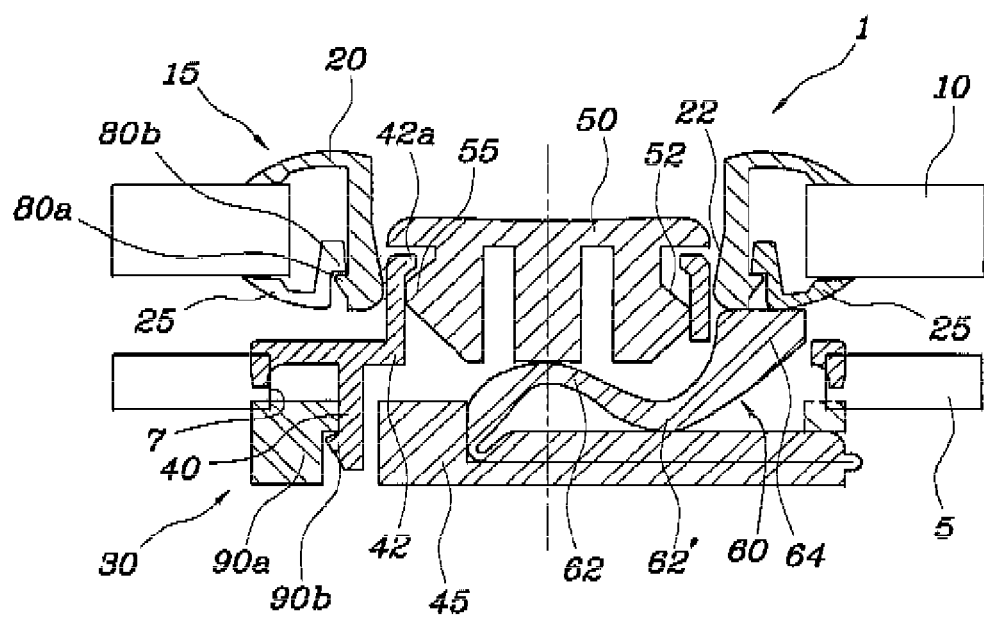
FIG. 5 is a cross-sectional view of the ring unit and button unit of FIG. 4A in their released state.

As shown in FIGS. 4A and 5, a mat 1 includes a mat body 10, which may be made of fabric or synthetic fiber, fastened to a vehicle floor carpet 5.

The mat 1 is provided with a ring unit 15 and a button unit 30. The ring unit 15 is engaged with the edge of a hole 12 in the mat body 10. The button unit 30 is provided under the ring unit 15, and is fixed to the floor carpet 5. The button unit 30 is in contact with the inner circumference of the ring unit 15, so that the ring unit 15 is releasably locked to the button unit 30, detachably fastening the mat body 10 to the floor carpet 5.

Several holes 12 may be provided in the mat body 10, each of which may have a ring unit 15 associated with it. Each ring unit 15 includes an upper ring 20 and a lower ring 25, which are positioned at the upper and lower ends of the edge of the hole 12. The upper and lower rings 20 and 25 are pressed together at edges thereof such that they grip the mat body 10 between them.

The inner radius of the upper ring 20 narrows from the middle of the upper ring 20 to the lower end thereof, thus defining an inclined surface 22. Thus, when a notched cylinder 42 of the button unit 30 is widened at an edge thereof, the notched cylinder 42 is supported by the inclined surface 22 of the upper ring 20. When a push plate 50 of the button unit 30 moves upwards, a protruding part 55 of the push plate 50 enlarges the notched cylinder 42. In other words, when the push plate 50 moves upwards from the configuration shown in FIG. 5 to that shown in FIG. 4A, the protruding part 55 presses the notched cylinder 42 outwards such that it abuts the inclined surface 22.

Figure 1:
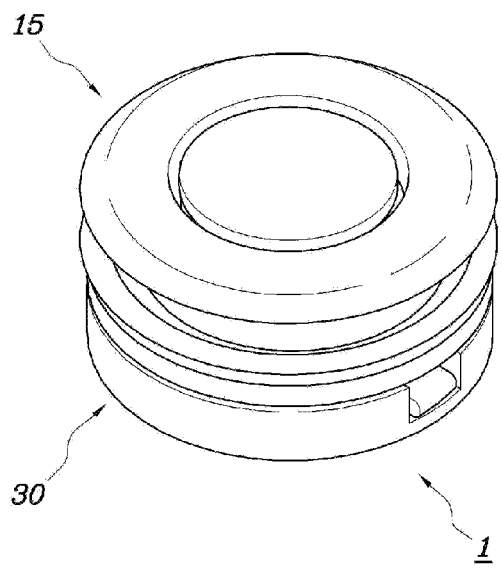
FIG. 1 is a perspective view of an exemplary ring unit coupled with an exemplary button unit.
Figure 2A:
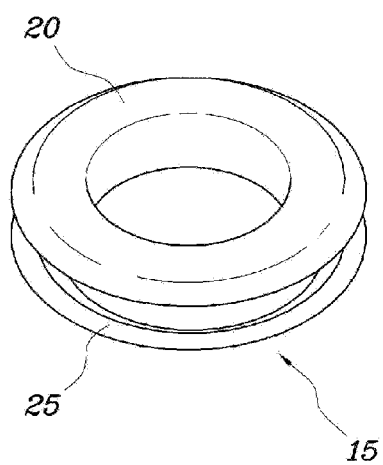
FIG. 2A is a perspective view of the ring unit shown in FIG. 1.
Figure 2B:
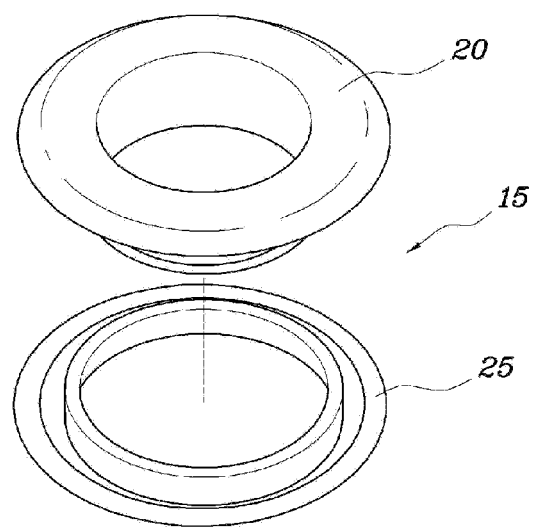
FIG. 2B is an exploded perspective view of the ring unit of FIG. 2A.
Figure 3A:
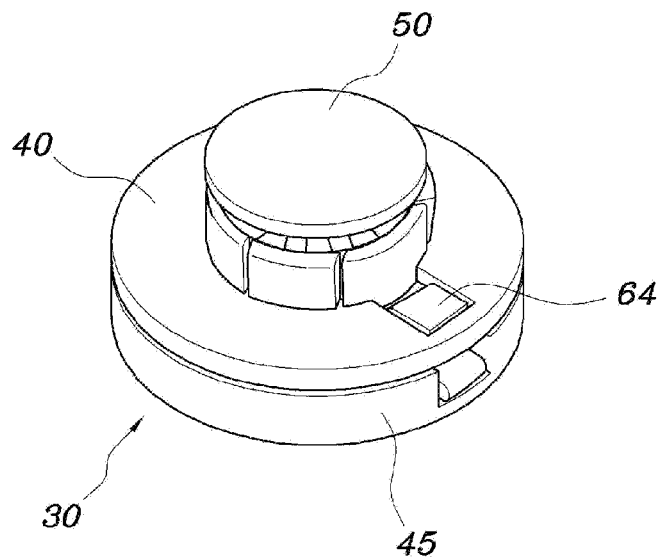
FIG. 3A is a perspective view of the button unit shown in FIG. 1.
Figure 3B:
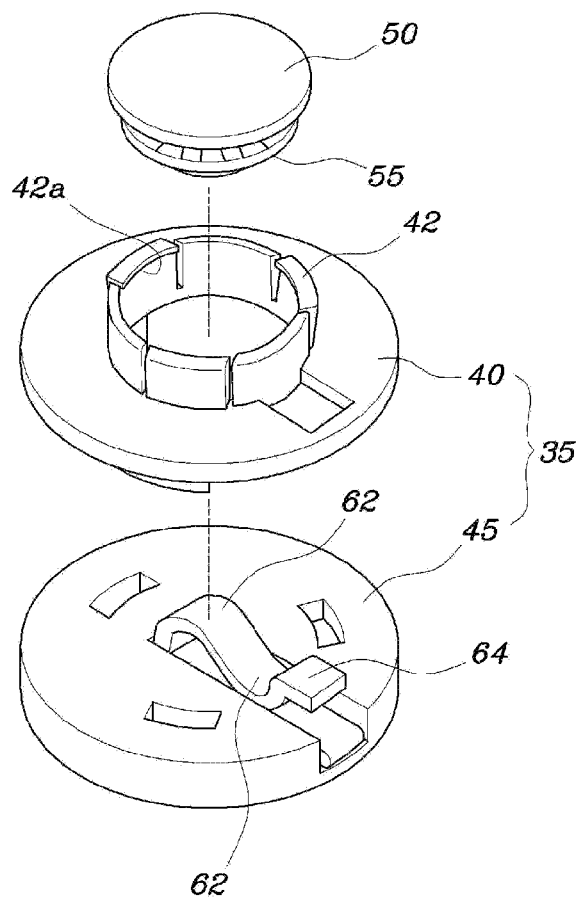
FIG. 3B is an exploded perspective view of the button unit of FIG. 3A.

Referring also to FIG. 3B, the button unit 30 includes a fixing part 35, which is fixed to the floor carpet 5, and the push plate 50, which is fitted into the fixing part 35 in such a way as to be inserted into the ring unit 15. The fixing part 35 is pressed against an associated hole 7 in the floor carpet 5 so as to be secured thereto. The fixing part 35 is disposed under the ring unit 15 coupled to the mat body 10.

The fixing part 35 includes an upper plate 40, having the notched cylinder 42 therein, and a lower plate 45. The upper plate 40 is disc-shaped, and is pressed against the floor carpet 5, with the notched cylinder 42 protruding upwards.

A locking step 42a protrudes inwards from the upper end of the notched cylinder 42. The locking step 42a is in contact with an inclined surface 52 which is provided on the lower end of the push plate 50. This construction prevents the removal of the push plate 50.

The edge of the lower plate 45 is pressed against the floor carpet 5, together with the edge of the upper plate 40. A seesaw-type push rod 60 is provided in the lower plate 45.

The seesaw-type push rod 60 contacts the lower portions of the push plate 50 and the ring unit 15. The seesaw-type push rod 60 includes a bend 62, and is generally S-shaped. The bent part 62 supports the lower portion of the push plate 50, while an end 64 of the push rod 60 supports the lower portion of the ring unit 15.

Figure 4B:
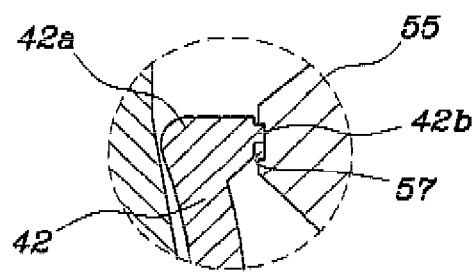
FIG. 4B is an enlarged view of portion "A" of FIG. 4A.

As shown in FIGS. 4A and 5, the push plate 50 moves up and down within the notched cylinder 42 of the upper plate 40. The protruding part 55 of the push plate 50 is secured to the locking step 42a of the notched cylinder 42. To this end, a fitting groove 57 (FIG. 4B) is provided in the outer surface of the protruding part 55, and a fitting projection 42b of the notched cylinder 42 is fitted into the fitting groove 57.

Reference numerals 80a and 80b denote coupling protrusions for coupling the upper ring 20 to the lower ring 25. Reference numerals 90a and 90b denote a coupling step and a coupling protrusion, respectively, for coupling the upper plate 40 to the lower plate 45.

The mat 1 can be conveniently released from the floor carpet 5 in a one-touch manner, and can be automatically locked to the floor carpet 5 merely by placing the mat body 10 on the floor carpet 5, as will now be described.

For example, as shown in FIG. 5, when a user desires to mount the mat body 10 to the floor carpet 5, each ring unit 15 provided on the mat body 10 is seated on a corresponding button unit 30. Subsequently, the mat body 10 is pressed down. At this time, as shown in FIG. 4A, the notched cylinder 42 of the button unit 30 is inserted into the ring unit 15.

In this case, the inclined surface 22 of the ring unit 15 is coupled to the upper end of the notched cylinder 42, which is curved outwards. Thereby, the ring unit 15 is coupled to the button unit 30, and the mat body 10 is coupled to the floor carpet 5, so that the mat 1 is stably fastened to the floor carpet 5.

Here, the outer radius of the notched cylinder 42 is larger than the inner radius of the lower end of the ring unit 15, so that a locked state is achieved. At this time, the fitting projection 42b of the notched cylinder 42 is fitted into the fitting groove 57, so that the locked state is not unexpectedly released. The upper surface of the push plate 50 is slightly lower than the upper surface of the ring unit 15. This construction prevents the push plate 50 from being directly pressed when a user presses the ring unit 15 with his or her foot.

Meanwhile, when a user desires to release the mat 1, as shown in FIG. 5, the user has only to press the push plate 50 with his or her finger. When the push plate 50 is pressed, the protruding part 55 of the push plate 50 moves down along the notched cylinder 42, so that the radius of the notched cylinder 42 is reduced. In this state, the ring unit 15 can be removed from the notched cylinder 42. Simultaneously, the mat body 10 can be removed from the floor carpet 5.

When the push plate 50 is pressed down, the upper bent part 62 of the push rod 60 is pressed, moving the end 64 of the push rod 60 upwards as push rod 60 pivots about its lower pivotal bent part 62', in turn pressing the ring unit 15 upwards. Thereby, the mat body 10 is raised slightly upwards so as to be easily removed from the floor carpet 5.

When the locked state is released in this way, the mat body 10 can be separated from the floor carpet 5.

Meanwhile, when a user desires to mount the mat body 10 to the floor carpet 5, the mat body 10 is pressed down. The ring unit 15 presses the end 64 of the push rod 60 downwards, while the upper bent part 62 pushes the push plate 50 upwards. Thereby, the protruding part 55 of the push plate 50 is moved upwards, so that the fitting projection 42b of the notched cylinder 42 is fitted into the fitting groove 57 of the protruding part 55. Consequently, the mat 1 is automatically locked.

Although preferred embodiments of the present invention have been disclosed for illustrative purposes, those skilled in the art will appreciate that various modifications, additions and substitutions are possible, without departing from the scope and spirit of the invention as defined in the accompanying claims.

What is claimed is:

1. A fastener, comprising first and second fastener units configured to be releasably attached to one another,
   wherein the first fastener unit comprises a ring wherein a radial diameter in an inclined inner surface thereof narrows in a downward axial direction of the ring; and
   wherein the second fastener unit comprises:
      an upper plate defining a notched cylinder configured to abut the inclined inner surface of the ring;
      a lower plate coupled to the upper plate, the lower plate comprising a pivotal push rod; and
      a push plate engaged with an inner surface of the upper plate within the ring, the push plate operable by a user to press the push rod in a downward direction such that the pivotal push rod presses the ring in an upward direction to move the ring upward;
      the push plate comprising a protrusion configured to press the notched cylinder against the inner surface of the ring when the fastener units are attached to one another and the push rod biases the push plate upward to lock the notched cylinder between the ring and the push plate, and to release the notched cylinder when the push plate when the push plate is operated by the user.

2. The fastener as set forth in claim 1, wherein the notched cylinder comprises a locking step on an upper end thereof, wherein the push plate comprises a slanted surface on a lower end thereof, wherein the locking step protrudes inwards and is in contact with the slanted surface of the push plate when the fastener units are attached to one another, thus preventing removal of the push plate.

3. The fastener as set forth in claim 1, wherein the push plate includes a protruding part wherein the protruding part comprises a groove on an outer surface thereof, wherein the notched cylinder comprises a projection at an upper end thereof configured to be fitted into the groove.

4. The fastener as set forth in claim 1, wherein the first fastener unit is disposed in a mat, and wherein the second fastener unit is attached to a floor.

5. A mat, comprising:
   a first fastener unit comprising a ring wherein a radial diameter in an inclined inner surface thereof narrows in a downward axial direction of the ring, the first fastener unit being configured and dimensioned to be releasably attached to a second fastener unit attached to a floor, wherein the first fastener includes a push plate;

wherein the second fastener includes a pivotal push rod having first and second bend portions to form an S shape and curvature centers of the first and second bend portions are disposed in an opposite direction of each other; and wherein the ring is pushed in a first direction by the first bend portion of the push rod when the second bend portion is pressed by the push plate in a second direction; and wherein the push plate is pushed in the first direction by the second bend portion of the push rod when the first bend portion is pressed by the ring in the second direction.

6. A fastener unit configured to be attached to a floor and to be releasably attached to an additional fastener unit disposed in a mat, the additional fastener unit comprising a ring wherein a radial diameter in an inclined inner surface thereof narrows in a downward axial direction of the ring, the fastener unit comprising:

an upper plate defining a notched cylinder configured to abut the inclined inner surface of the ring;

a lower plate comprising a pivotal push rod; and a push plate operable by a user to press the push rod such that the push rod presses the ring upward when the user presses the push plate downwards to release the notched cylinder from the ring, and the push rod presses the push plate upwards when the user presses the ring downwards;

the push plate comprising a protrusion configured to press the notched cylinder against the inner surface of the ring when the ring is pressed to attach the fastener units to one another.

7. The fastener as set forth in claim 1, wherein the pivotal push rod has bend portions to form an S shape and a curvature center of each adjacent bend portion is disposed in an opposite direction respectively.

8. The fastener as set forth in claim 6, wherein the pivotal push rod has bend portions to form an S shape and a curvature center of each adjacent bend portion is disposed in an opposite direction respectively.

* * * * *